March 6, 1962 P. CAVEL 3,024,348
METHOD AND APPARATUS FOR MANUFACTURING WELDED TUBING
Filed March 25, 1960 5 Sheets-Sheet 1

INVENTOR
PIERRE CAVEL
by Holcombe, Wetherill & Brisebois
ATTYS.

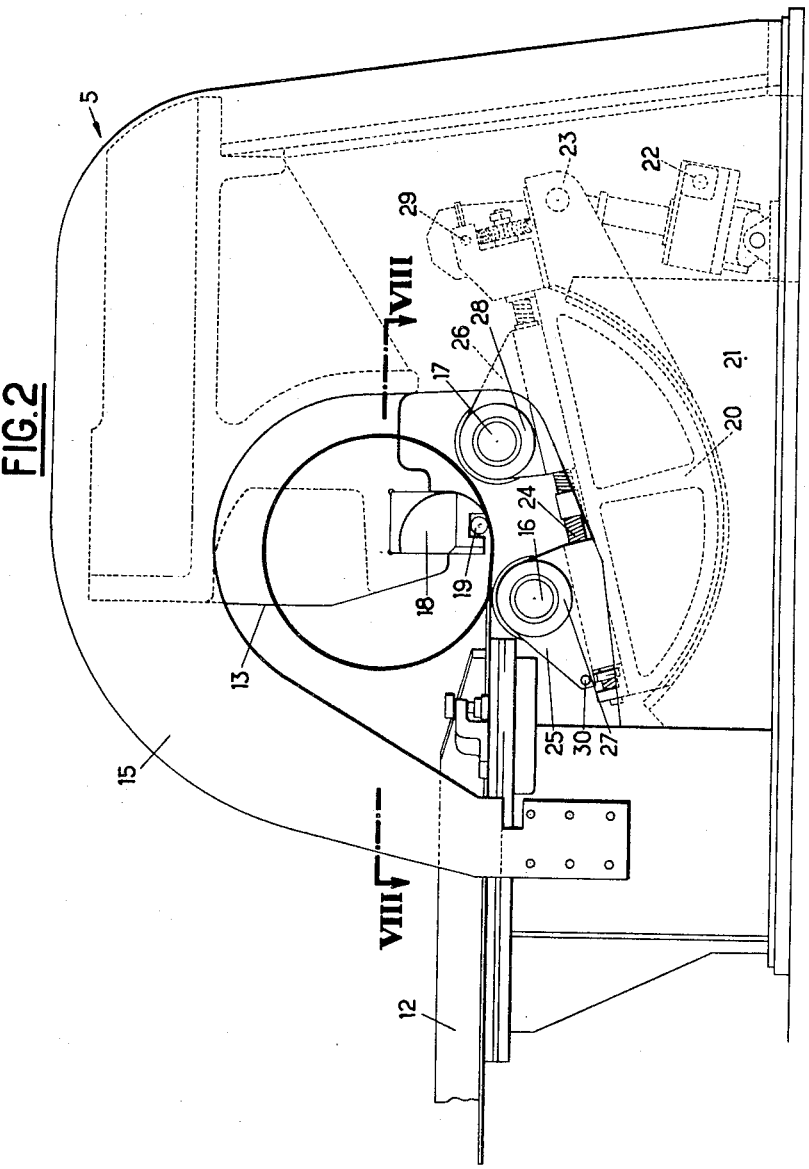

March 6, 1962 P. CAVEL 3,024,348
METHOD AND APPARATUS FOR MANUFACTURING WELDED TUBING
Filed March 25, 1960 5 Sheets-Sheet 3
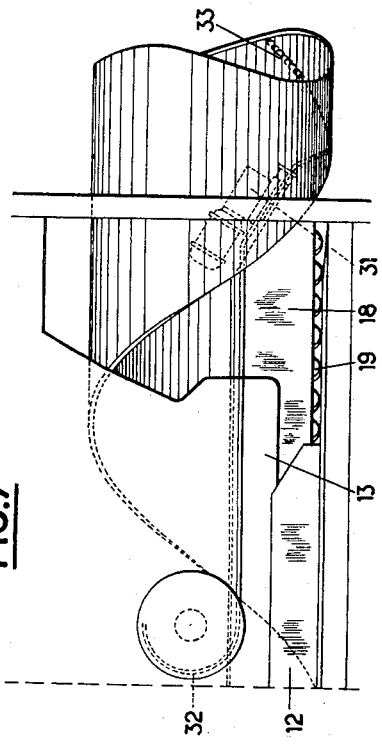
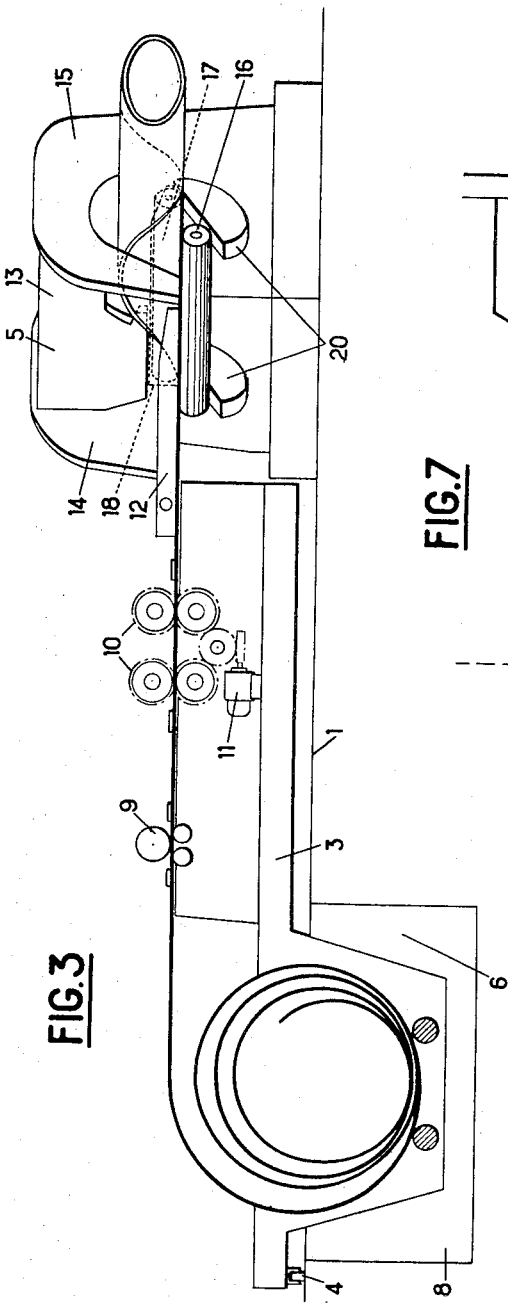
INVENTOR
PIERRE CAVEL March 6, 1962 P. CAVEL 3,024,348
METHOD AND APPARATUS FOR MANUFACTURING WELDED TUBING
Filed March 25, 1960 5 Sheets-Sheet 4
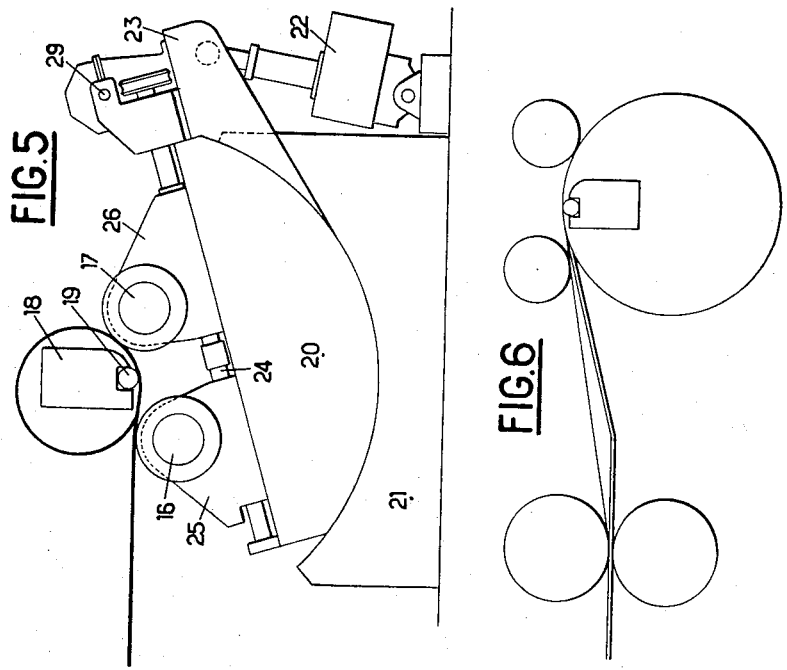
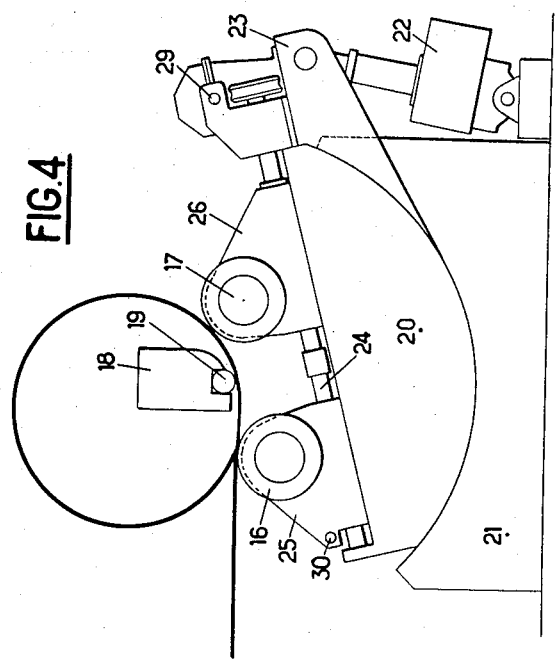
INVENTOR
PIERRE CAVEL

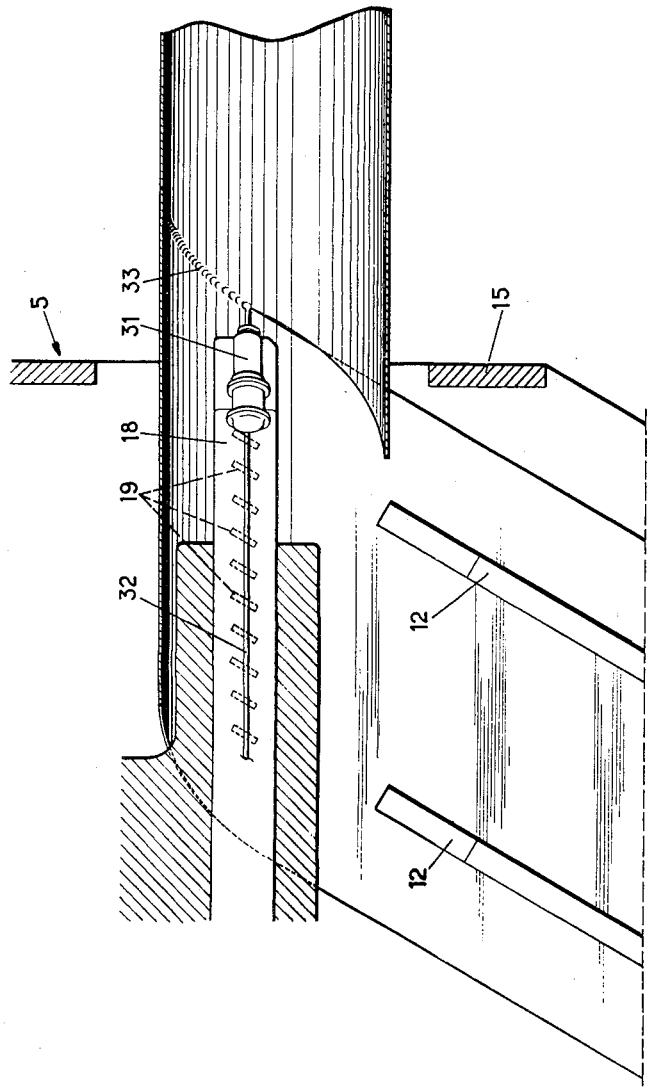

United States Patent Office 3,024,348
Patented Mar. 6, 1962

3,024,348
METHOD AND APPARATUS FOR MANUFAC-
TURING WELDED TUBING
Pierre Cavel, Aulnoye, France, assignor to Societe
Anonyme dite: Vallourec, Paris, France, a corporation
of France
Filed Mar. 25, 1960, Ser. No. 17,677
Claims priority, application France Mar. 27, 1959
7 Claims. (Cl. 219—62)

Continuous tubes have heretofore been manufactured by spirally winding metallic strips and welding together the adjacent edges of the coils so formed. A device having a horizontal axis is used for this purpose and comprises guides and counter-guides which are adjustable in accordance with the desired diameter. These guide the strip into a spiral as it leaves a feeding device which is mounted on an arm which pivots horizontally about the aforesaid forming device. The feeding device supplies the strip to the forming means at an inclination or coiling slope which is variable as a function of the diameter of the tube and the width of the strip. The selected inclination or coiling slope is maintained and the desired diameter secured by appropriate adjustment of the guides and counter-guides.

In order to produce a satisfactory coiling it is important that the strip should not undergo any deformation before entering the forming machine. In the machines heretofore known the first or input forming guide on which the strip rests is usually at a horizontal level different from that of the path of travel, either because this level varies with the tube diameter selected, or when it is fixed, because it is constructed at a height sufficiently different from that of the incoming strip to oblige it to bend as it advances toward its future winding direction, without a sharp turn at the input guide. In either case, the strip must leave its horizontal feeding plane after leaving the last feed roller and change to a different horizontal level on the input guide, the direction of which differs from that of the roller in proportion to the coiling slope selected. The strip is thus subjected to a twisting or torsion which is extremely detrimental to an exact coiling and constitutes the source of a number of practical difficulties.

Various means have been suggested in an attempt to overcome these difficulties. In some cases the height of the feeding path has been made adjustable so that it may always be maintained in the horizontal plane of the input guide, but this leads to major complications. In other cases, the strip has been led from the feeding path to the input guide along an inclined plane turning about this guide while maintaining it in the feed path from the last roller to the intersection between said path and the inclined plane, by means of retaining members which are adjustable in length, but the adjustment of these retaining members is also complicated and the strip is still deformed in a by no means negligible manner.

The present invention envisages the complete avoidance of any preliminary deformation of the strip in a simple manner. Its object comprises a method of manufacturing a welded tube obtained from a metallic strip which is spirally wound by means of forming devices, the process being essentially characterized by the fact that the strip which is to be formed into the tube is led in a horizontal plane which is substantially tangent to the tube being made therefrom.

In a preferred embodiment of the invention, the metallic strip is led along a horizontal plane tangent to the lower part of the tube, the devices for adjusting the forming elements, which are three in number, being set so that the first two of these elements to be encountered by the strip are positioned in the said horizontal plane.

Another object of the invention is the new article of manufacture which consists of a machine by means of which the process according to the invention may be carried out, this machine being characterized by the fact that it comprises in combination members permitting the metallic strip to be led in a fixed horizontal plane in a direction making a variable angle with the generatrices of the tube, which is proportional to the diameter of the tube and the width of the strip, and members for forming the metallic strip, which comprise a fixed mandrel (preferably carrying a series of rollers inclined to the mandrel's axis) and two rotating forming cylinders so mounted as to be displaced in a plane parallel to themselves, on a cradle which may be pivoted about the working part of the fixed mandrel.

In a preferred embodiment of the invention the forming means are positioned near the lower part of the tube being manufactured, thus providing excellent conditions for continuously welding it from the inside.

In order that the invention may be better understood, one embodiment thereof will now be described, purely by way of example, as shown on the accompanying drawings, in which:

FIGURE 2 is a side view on a larger scale, taken from the side indicated by the arrow B of FIG. 1;

FIGURE 3 is a partial schematic elevational view of the same embodiment of the invention, taken from the side indicated by the arrow C of FIG. 1;

FIGURES 4 and 5 are two schematic views showing the forming of the strip to two different diameters;

FIGURE 6 is a schematic view showing the forming of the strip by means of a prior art device;

FIGURE 7 is a partial view showing the welding means; and

FIGURE 8 is a sectional view along the line VIII—VIII in FIGURE 2 showing the positions of the rollers comprising the rolling part of the mandrel.

Figure 1:
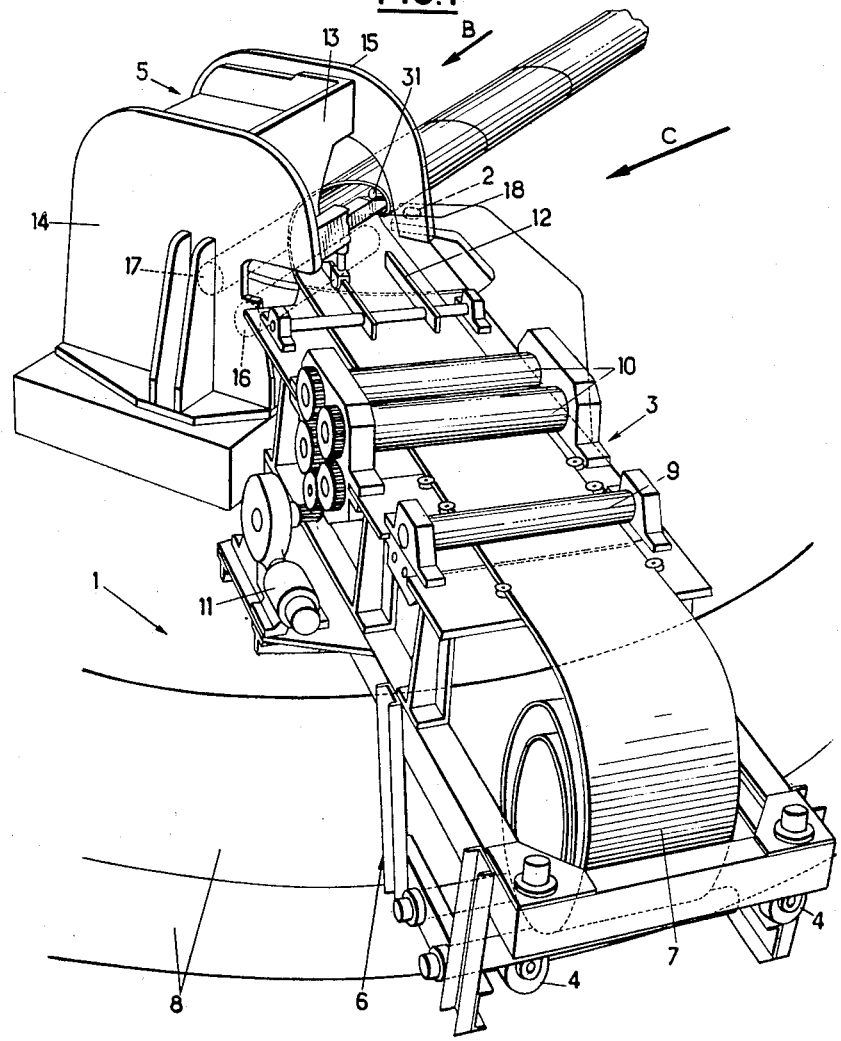
FIGURE 1 is a perspective view of the assembly of one embodiment of the invention.

FIGURE 1 shows a base 1 carrying a vertical axis 2. The feeding arm 3 turns about this axis and travels on rollers 4 over circular rails carried by the base 1, while the forming means 5 is stationarily mounted near the shaft 2.

The arm 3 carries near its free end a reel 6 adapted to hold the coil of sheet metal 7 mounted to overhang a gutter 8 in the base 1 concentric with the axis 2. Upon leaving the reel, the end of the strip passes under a flattening roll 9, under squeeze rolls 10 controlled by a motor 11, and then under guide means 12 from which it passes to the forming device 5.

The forming machine 5 comprises a box having a longitudinal face 13 turned toward the strip and two end faces 14 and 15 suitably cut back to permit pivoting of the arm 3 and entry of the strip as well as the exit of the formed tube. The forming members per se consist of two cylinders 16 and 17 positioned on opposite sides of a mandrel 18 carrying, as seen in FIG. 2, juxtaposed rollers 19 having in each case the same slope as the strip with respect to the axis of the mandrel. This mandrel 18 is fixed near one of its ends and for part of its length to the surface 13 of the box 15, which is cut out to permit the introduction of the strip. The mandrel is free at its other end, and the casing 15 is cut out as necessary to permit coiling and subsequent separation of the tube from the mandrel.

In the arrangement shown on FIGURE 2, and in an identical manner at both ends, the forming cylinders 16 and 17 are fixed to a cradle 20 having a part-cylindrical lower surface and this cradle turns about the axis of alignment of the rollers 19 of the mandrel in a concentric supporting guide 21. The cradle is actuated by a screw jack 22 mounted on a rod connecting the outer arms 23 of the cradle.

The upper part of the cradle 20 carries bearings journaling a shaft 24 provided with two portions which are threaded in opposite directions. These threads mesh with the corresponding inner threads of two members 25 and 26 guided in the upper part of the cradle and supporting the bearings 27 and 28 of the forming cylinders 16 and 17.

A worm screw control 29 permits the shaft 24 to be turned and move the forming cylinders 16 and 17 closer to or further away from the mandrel 18. On the other hand, the control screws 30 mounted in the supports for the bearings 25 of the cylinder 16 permit them to be brought closer to or withdrawn away from the mandrel 18 singly. By combining the actions of the controls 29 and 30 the axes of the cylinders 16 and 17 may be made to converge slightly if necessary to compensate for flexing of the mandrel.

The operation of the machine will be better understood when considered in conjunction with schematic FIGURES 3 to 6.

FIGURE 3 shows the path travelled by the incoming strip which is flattened and drawn forward by the squeeze rolls 10 through the flattening rolls 9 and guided by the guide members 12. This path lies in a horizontal plane. It may be seen from this figure as well as from FIGURES 4 and 5 that it is possible to make the plane of entry of the strip into the former coincide with the plane along which it is fed, and to thus prevent any deformation or torsion of the strip before it is coiled. The control 29 is used for this purpose and the control 30 may also be used for regulation, in proportion to the diameter of the tube to be made (see FIGS. 4 and 5 relative to two different diameters) of the respective positions of cylinders 16 and 17 with respect to the mandrel 18, 19. The cradle 20 may then be adjusted by means of the screwjack to the necessary angle to bring the cylinder 16 tangent to the feed plane. The strip is thus fed in without any change in plane and curves only slightly between the cylinder 16 and the mandrel 18, 19, the rollers 19 being adjacent the feed plane. The bending is thus brought about by the combination of the rollers 19 and the cylinder 17.

By way of comparison FIG. 6 shows the passage of the strip into a former of the type heretofore known comprising two forming cylinders, which may be displaced only in a horizontal direction with respect to the mandrel, without any possibility of successive rotation. The strip goes in obliquely to the axis of the forming cylinder in an inclined plane tangent to the lower part of this cylinder. It follows that between the squeeze rollers and the first cylinder, the strip curves as shown on the figure, the rear edge of which (with respect to the coiling direction) is substantially straight, whereas its front edge is more or less curved depending on whether the selected coiling diameter is larger or smaller.

It should be noted that in the arrangement shown in FIGURE 6, the strip passes over the mandrel and below the forming cylinders. In accordance with the preferred embodiment of the invention herein described, the opposite arrangement is adopted, so that the band passes below the mandrel and over the forming cylinders. The latter arrangement is better adapted to rotational movement of the supporting cradle of the forming cylinders with respect to the mandrel.

On the other hand, the tube is formed from bottom to top; its entrance is thus largely open toward the outside and is not encumbered by the mandrel which extends only part way into the lower part of the tube, as seen on FIGURE 7. This arrangement is more satisfactory for welding, the careful and continuous execution of which is of the greatest importance. Up to the present it has been necessary to rely on internal welding means controlled from the outside without easy access to the place where the welding is being done and consequently without the possibility of visual surveillance. On FIGURE 7, on the contrary, it will be seen that the welding head 31 is mounted in an easily accessible manner in the lower part of the first coil near the free end of the mandrel, whereas the coil of wire of the electrode 32 is fixed at the height of the other end of the mandrel outside the wall 13 of the box 5, and the wire of the electrode leads from the coil to the welding head through the recess in the wall 13 and along the mandrel without affecting the coiling. This results in an excellent continuous inner weld visible at 33.

What is claimed is:
1. Machine for manufacturing welded tubing by spirally coiling a metallic strip and welding together the adjacent edges thereof, said machine comprising in combination means for feeding in the strip along a fixed horizontal plane at an adjustable angle to the direction of the generatrix of the tube, said angle being proportionate to the diameter of the tube being formed and the width of the strip, and forming means comprising a fixed mandrel associated with a plurality of rollers having axes inclined to that of the mandrel and having their working surfaces in alignment with said horizontal plane, and two forming cylinders adjustably mounted on opposite sides of the mandrel for translation transversely of their axes in a single plane, said cylinders being carried by a cradle pivotally mounted to turn about the working surface of the mandrel.

2. A machine as claimed in claim 1 in which the mandrel and cylinder are positioned near the lower part of the tube being formed.

3. Machine as claimed in claim 1 in which the cradle is pivotally actuated by a screw-jack.

4. A machine as claimed in claim 1, in which the forming cylinders are mounted in bearings having threaded portions meshing with a screw having sections threaded in opposite directions, said screw being mounted on said cradle and controlled by worm gearing, the rotation of which simultaneously displaces both of said forming cylinders.

5. A machine as claimed in claim 1 in which said forming cylinders are adjustably mounted for independent individual displacement.

6. A machine as claimed in claim 1 in which the ends of the forming cylinders on the output side of the machine may be moved independently of their opposite ends.

7. A machine as claimed in claim 1 comprising a welding head fixed near the working end of the mandrel and the point at which the first coil is formed, the spool of wire of the electrode being mounted at the other end of the mandrel outside of the longitudinal wall of a casing enclosing the forming means, said wire passing from the spool to the welding head through an opening in said wall.

References Cited in the file of this patent
UNITED STATES PATENTS

| | | |
|---|---|---|
| 1,679,499 | Rupley | Aug. 7, 1928 |
| 1,795,380 | Stresan | Mar. 10, 1931 |
| 1,868,039 | Williams | July 19, 1932 |
| 1,923,284 | Taylor et al. | Aug. 22, 1933 |